United States Patent [19]

Murakami et al.

[11] Patent Number: 5,060,054
[45] Date of Patent: Oct. 22, 1991

[54] DEVICE FOR CONTROLLING A COLOR VIDEO DISPLAY

[75] Inventors: Joji Murakami; Minoru Wano, both of Kawasaki, Japan

[73] Assignees: Fujitsu Limited; Fujitsu Microcomputer Systems Limited, both of Kawasaki, Japan

[21] Appl. No.: 278,501

[22] Filed: Dec. 1, 1988

[30] Foreign Application Priority Data

Dec. 4, 1987 [JP] Japan ............................ 62-307929

[51] Int. Cl.⁵ ............................................. H04N 9/68
[52] U.S. Cl. .................................................... 358/27
[58] Field of Search ..................... 358/23, 25, 27, 29, 358/35

[56] References Cited

U.S. PATENT DOCUMENTS

| | | | |
|---|---|---|---|
| 4,361,850 | 11/1982 | Nishimura | 358/27 |
| 4,547,797 | 9/1985 | Mick | 358/28 |
| 4,578,673 | 3/1986 | Yianilos | 358/27 |
| 4,626,835 | 12/1986 | Nienaber | 358/27 |

*Primary Examiner*—Tommy P. Chin
*Attorney, Agent, or Firm*—Armstrong, Nikaido, Marmelstein, Kubovcik & Murray

[57] ABSTRACT

A device for controlling a color video display which includes ladder resistor units having a plurality of taps; a clock signal generating unit for generating four-phase clock signals having the same frequency as the frequency of a sub-carrier from a clock signal having a frequency which is four times the frequency of the sub-carrier, and a color signal generating unit for receiving data corresponding to colors to be displayed and for generating color signals, by successively selecting taps of the ladder resistor units corresponding to the colors to be displayed, in synchronization with the four-phase clock signals. The generation of color signals having a precise phase angle relationships are ensured by this device.

4 Claims, 23 Drawing Sheets

VECTOR DIAGRAM OF COLOR BAR
ACCORDING TO NTSC SYSTEM

VECTOR DIAGRAM OF COLOR BAR
FOR NEAR-BLUE COLOR

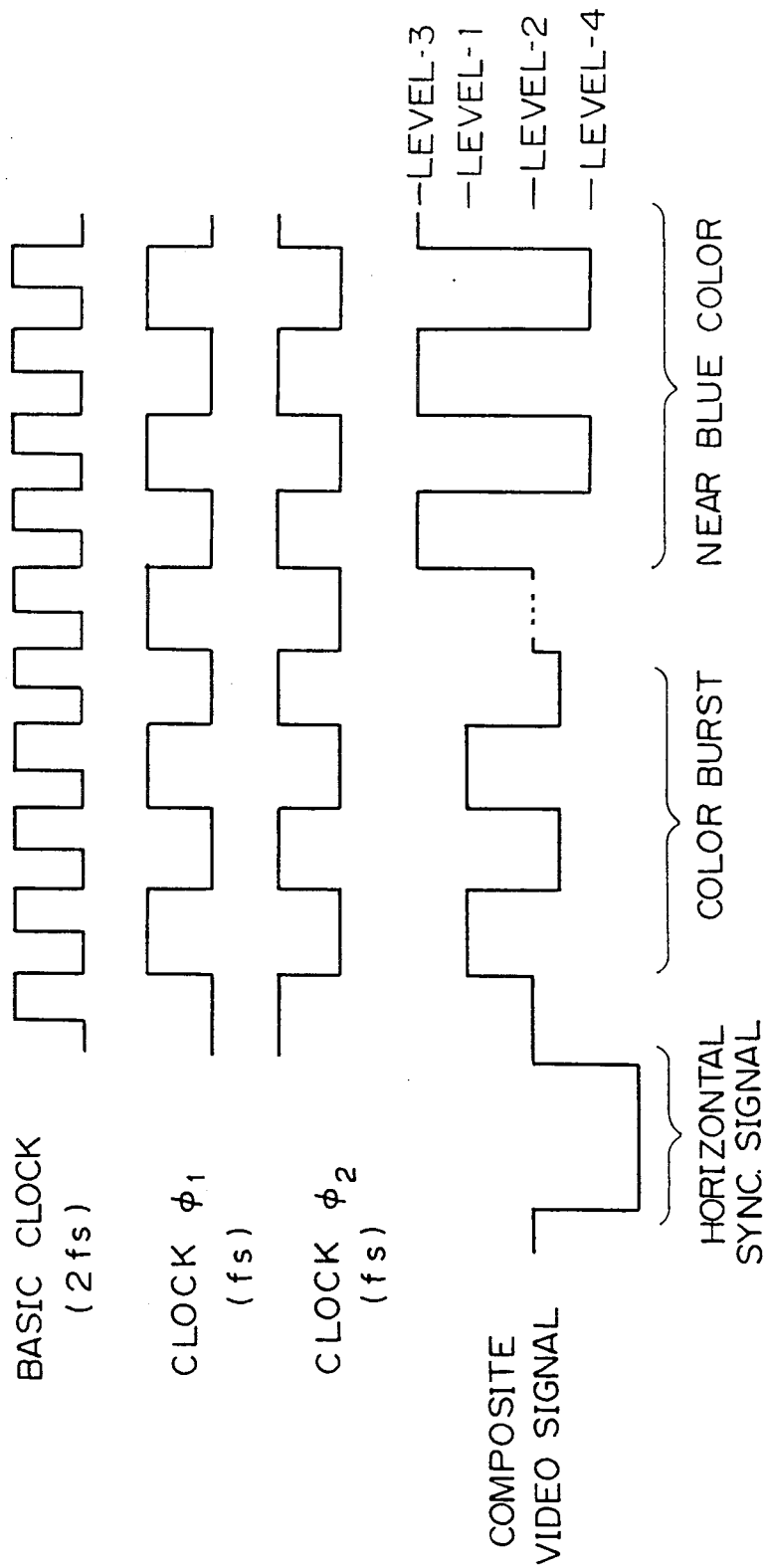

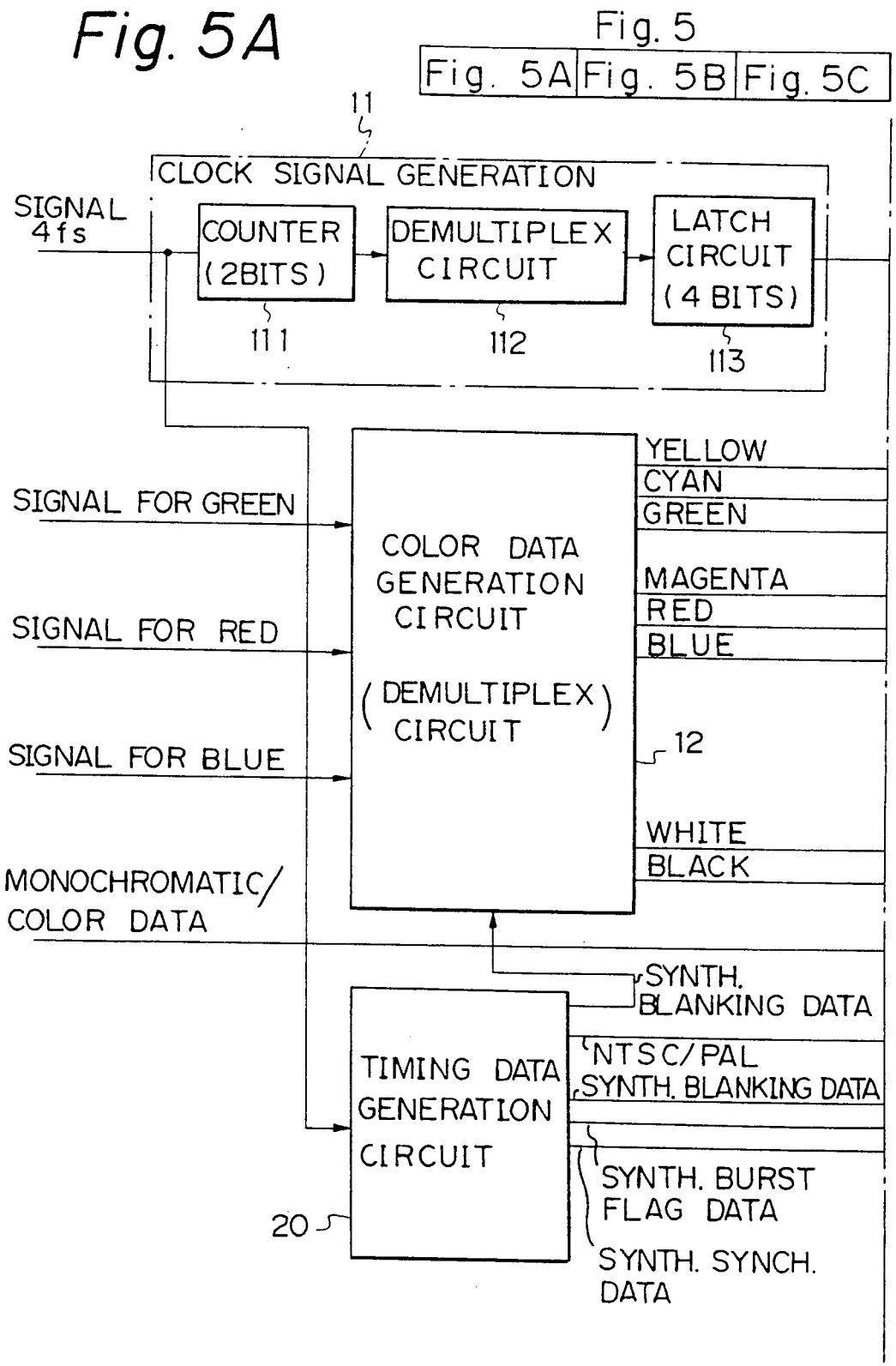

| Fig.6A |
| Fig.6B |

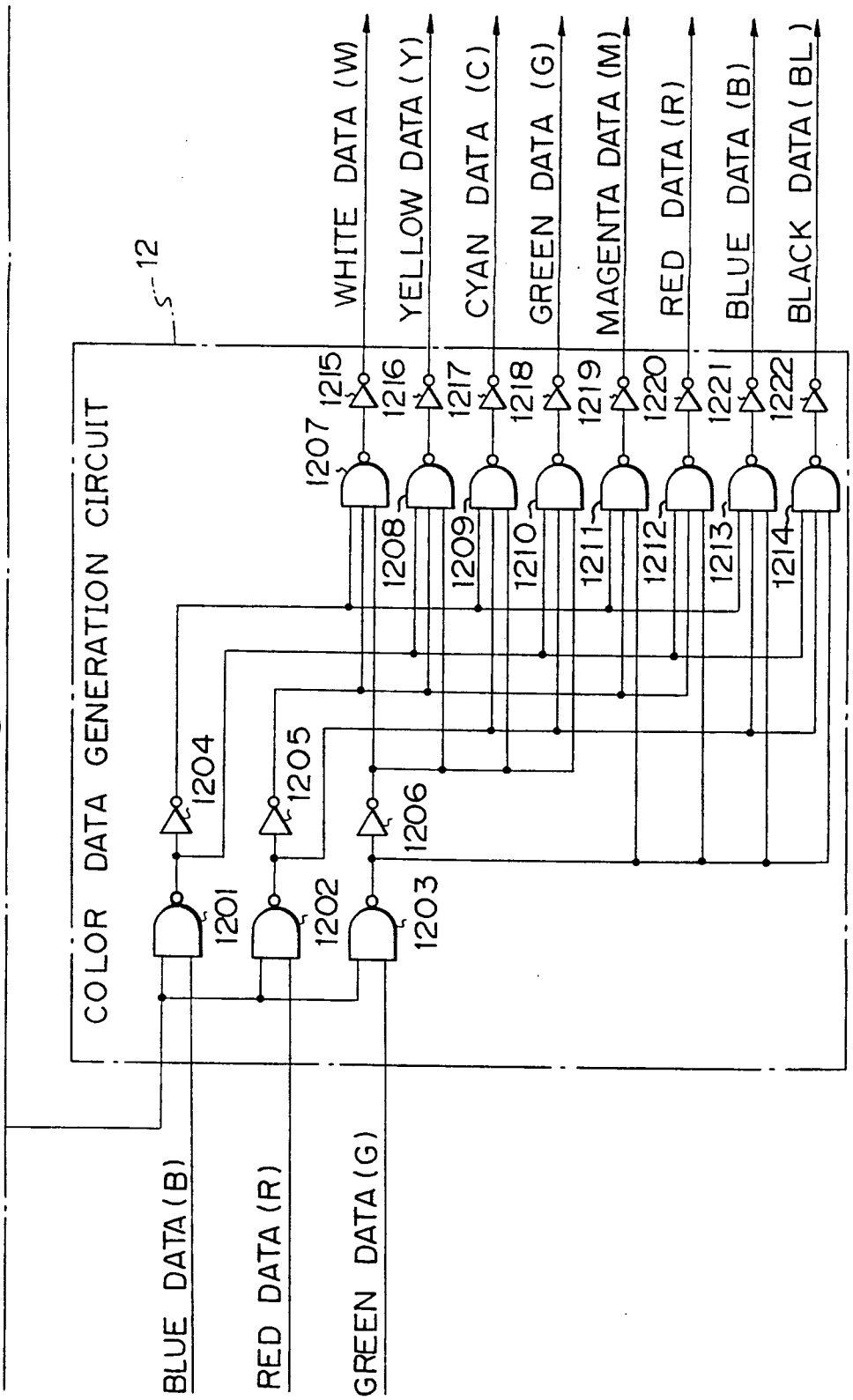

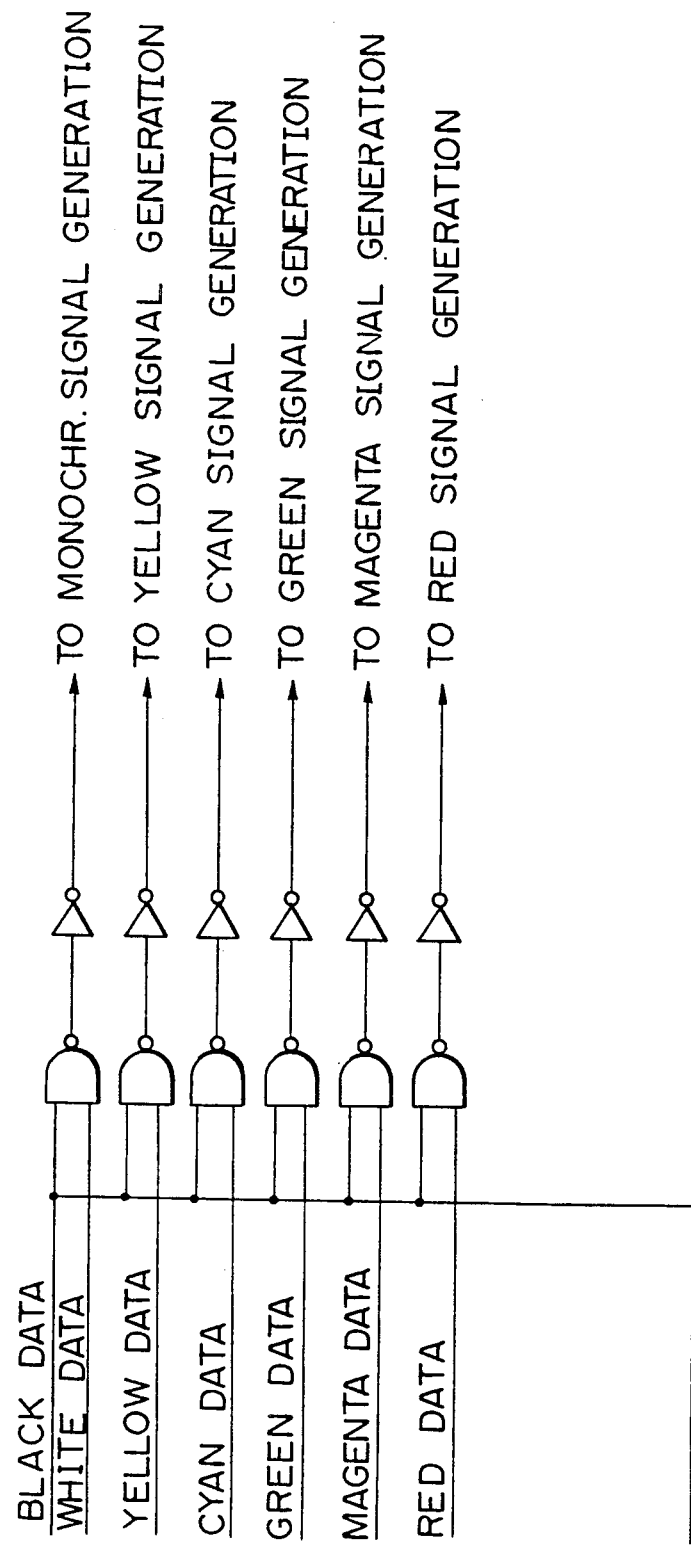

WAVEFORM SYNTHESIS FOR BLUE SIGNAL

WAVEFORM SYNTHESIS FOR COLOR BURST SIGNAL

VECTOR DIAGRAM ACCORDING TO PAL SYSTEM

COLOR BURST SIGNALS AT HORIZONTAL SCANNING TIMING "n" AND "n+1" IN PAL SYSTEM

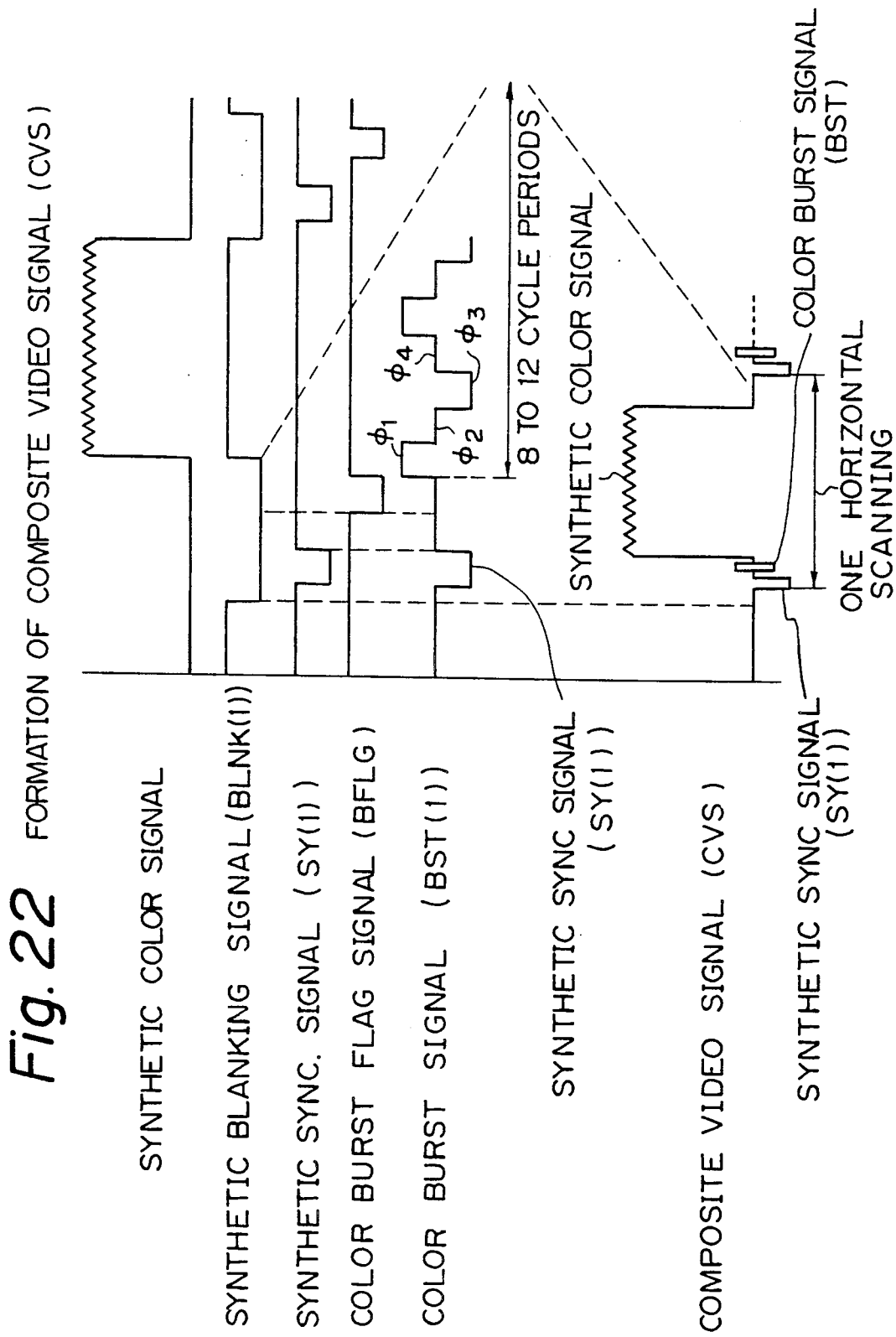
Fig. 22 FORMATION OF COMPOSITE VIDEO SIGNAL (CVS)

DEVICE FOR CONTROLLING A COLOR VIDEO DISPLAY

BACKGROUND OF THE INVENTION

1. Field of Invention

The present invention relates to a device for controlling a color video display. The device according to the present invention is used, for example, for video apparatuses, and television recording and display apparatuses or the like.

2. Description of the Related Arts

In general, in a device for controlling a display in a video apparatus, three-phase clock signals ($\phi_1$, $\phi_2$, $\phi_3$) are produced from the two phase clock signals ($\phi_1$ (fs), $\phi_2$ (fs)) or three times the frequency clock signal on the basis of a signal having a reference frequency which is twice the frequency fs of the subcarrier, which is equal to 3.58 MHz. By combining the produced three phase clock signals, $\phi_1$, $\phi_2$, $\phi_3$) having predetermined amplitudes with predetermined phase differences, various color signals and a color burst signal are produced to obtain a composite video signal.

In prior art devices for controlling a display in a video apparatus, however, a problem arises in that the generation of signals having precise phase differences therebetween cannot be ensured. Also, a problem arises in that the amplitudes of color signals cannot be changed, and therefore, the display of a correct color at a desired position along a horizontal scanning line cannot be made. Also, a problem arises in that the display according to the PAL system using a three phase clock signal having a frequency which is three times the subcarrier frequency, cannot be carried out.

SUMMARY OF THE INVENTION

An object of the present invention is to provide an improved device for controlling a color video display in which the generation of color signals having precise phase angle relationships is ensured.

Another object of the present invention is to provide an improved device for controlling a color video display in which the disadvantages of the prior art are eliminated.

According to the present invention, there is provided a device for controlling a color video display including: ladder resistor units having a plurality of taps; a clock signal generating unit for generating four-phase clock signals having the same frequency as the frequency of a sub-carrier from a clock signal having a frequency which is four times the frequency of the sub-carrier, and a color signal generating unit for receiving data corresponding to colors to be displayed and generating color signals by successively selecting the taps of the ladder resistor units corresponding to the colors to be displayed, in synchronization with the four-phase clock signals.

BRIEF DESCRIPTION OF THE DRAWINGS

In the drawings,

FIG. 4 shows the waveforms of the composite video signal for a near-blue color;

FIG. 22 illustrates the formation of the composite video signal.

DESCRIPTION OF THE PREFERRED EMBODIMENTS

Before describing the preferred embodiments of the present invention, the vector diagram of the color bar according to the NTSC system and the waveforms of the composite video signal in the prior arts will be explained with reference to FIGS. 1, 2, 3, and 4.

Figure 1:
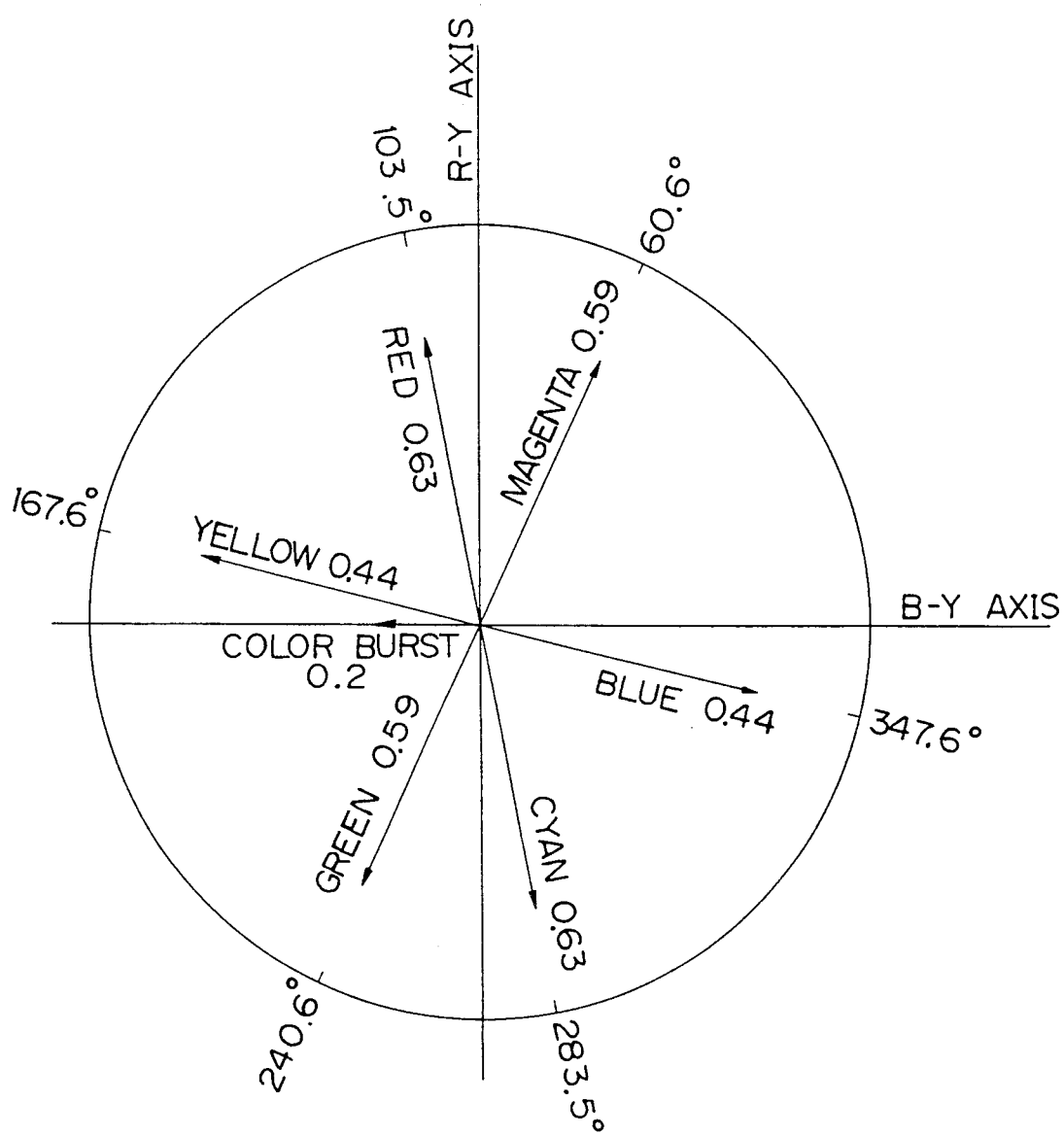
FIG. 1 is a vector diagram of the color bar according to the NTSC system of the prior art.

The vector diagram of the color bar signal according to the NTSC system is shown in FIG. 1. In FIG. 1, the abscissa represents the B-Y axis, and the ordinate represents the R-Y axis. The phase angle of the color burst signal is 180°, and it is assumed that the amplitude of the luminance signal ($E_Y$) is unity. The relative amplitudes of the carrier color signals for magenta, red, yellow, green, cyan, and blue are 0.59, 0.63, 0.44, 0.59, 0.63, and 0.44, respectively, and the phase angles of the carrier color signals for magenta, red, yellow, green, cyan, and blue are 60.6°, 103.5°, 167.6°, 240.6°, 283.5°, and 347.6°, respectively.

Figure 2:
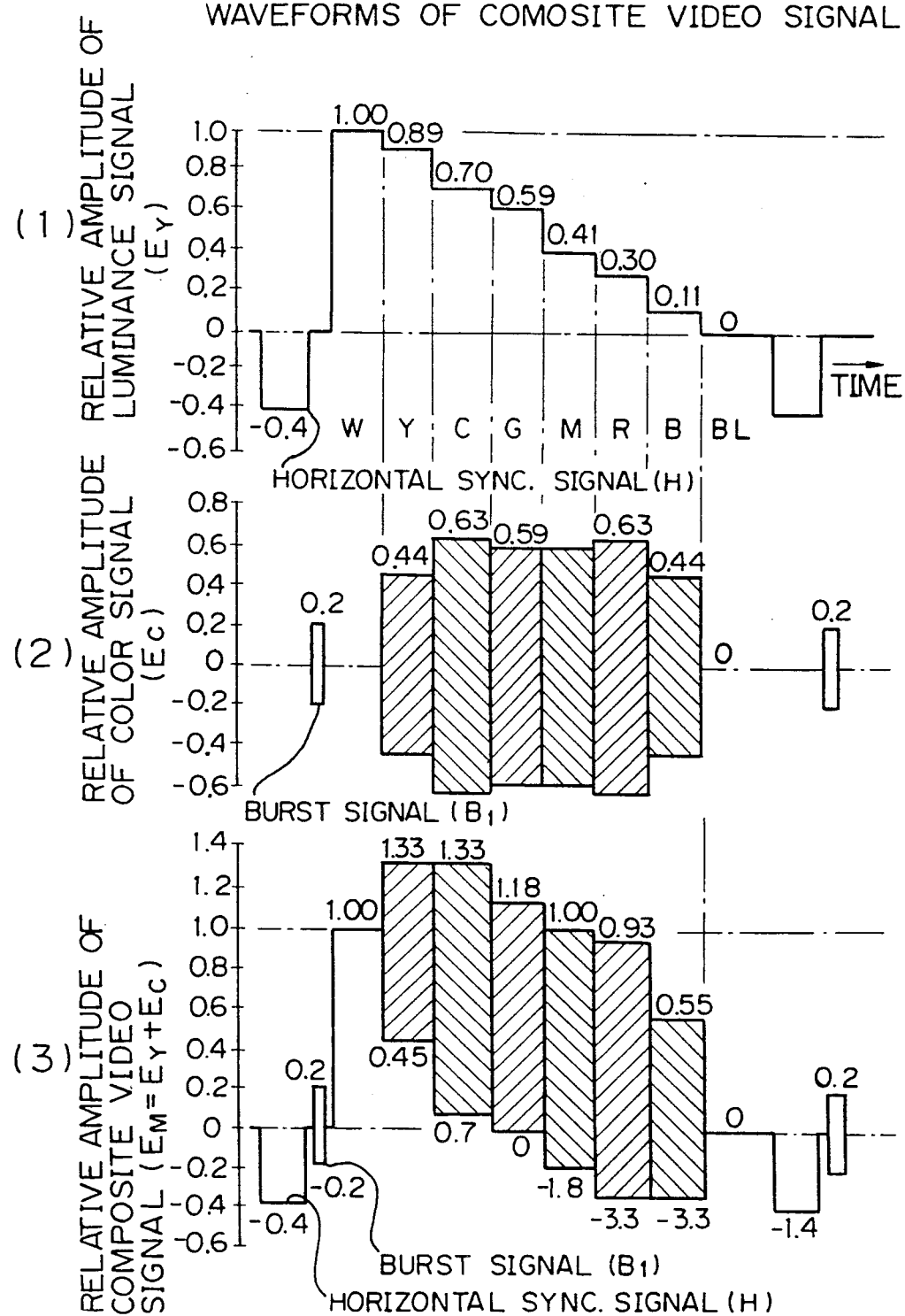
FIG. 2 shows the waveforms of the composite video signal in prior art.

The waveforms of the composite video signal according to the NTSC system in the prior arts are illustrated in FIG. 2. FIG. 2 shows (1) the waveform of the luminance signal $E_Y$ with the values of the relative amplitude thereof, (2) the waveform of the color signal $E_C$ with the values of the relative amplitude thereof, and (3) the waveform of the composite video signal $E_M$ with the values of the relative amplitude thereof. The composite video signal $E_M$ is the sum of the luminance signal $E_Y$ and the color signal $E_C$, i.e., $E_M = E_Y + E_C$.

The waveform (1) of FIG. 2 shows the relative amplitudes of the luminance signal $E_Y$. It is assumed that the relative amplitude for the white color is unity. The relative amplitudes of chrominance signals for yellow, cyan, green, magenta, red, blue, and black are 0.89, 0.70, 0.59, 0.41, 0.30, 0.11, and 0, respectively, and the relative amplitude for the horizontal synchronization signal is "−0.4".

The waveform (2) of FIG. 2, shows the relative amplitudes of the color signal $E_C$. Using the principle of a recognition of the chrominance by the human eye, the amplitudes of the colors are modified, and the relative amplitudes of the color signals for yellow, cyan, green, magenta, red, blue, and black are 0.44, 0.63, 0.59, 0.59, 0.63, 0.44, and 0, respectively. A color burst signal is inserted between the horizontal synchronization signal and the sequence of the color signals, and the relative amplitude of the color burst signal is 0.2.

The waveform (3) of FIG. 2 shows the relative amplitudes of the composite video signal $E_M$. The relative amplitudes of the composite video signals for white, yellow, cyan, green, magenta, red, blue, and black are 1.00, 1.33 to 0.45, 1.33 to 0.7, 1.18 to 0, 1.00 to −1.8, 0.93 to −3.3, 0.55 to −3.3 and 0, respectively. The color burst signal is inserted between the horizontal synchronization signal and the sequence of color signals, and the relative amplitudes for the horizontal synchronization signal and the color burst signal are −0.4 and 0.2 to −0.2, respectively.

Figure 3:
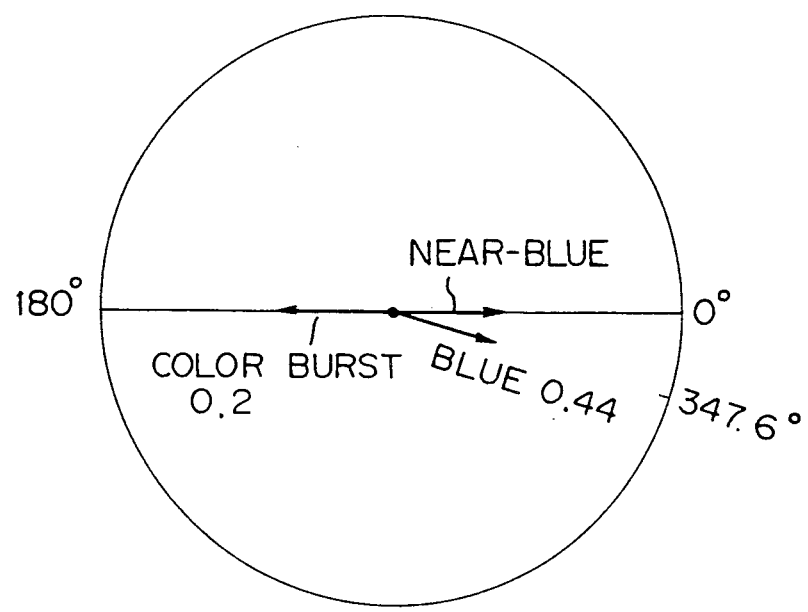
FIG. 3 is a vector diagram of the color bar for a near-blue color.

The vector diagram of a color bar for a near-blue color is shown in FIG. 3, and the obtaining of a mixed picture image signal for a near-blue color is illustrated in FIG. 4. In the waveforms of FIG. 4, the first waveform is the basic clock signal having twice the frequency 2fs of the subcarrier frequency fs of 3.58 MHz. By dividing the frequency 2fs of the basic clock signal, two-phase clock signals 1 and $\phi_2$ are produced, each having the frequency fs as the second and the third waveforms.

The composite video signal for the near-blue color is obtained by combining the two-phase clock signals $\phi_1$ (fs) and $\phi_2$ (fs) having predetermined amplitudes with a predetermined phase difference, as shown in the fourth waveform of FIG. 4. After the horizontal synchronization signal, the color burst signal is produced in which, when the level of $\phi_1$ (fs) is HIGH the LEVEL-1 of the color burst signal is output, and when the level of $\phi_2$ (fs) is HIGH the LEVEL-2 of the color burst signal is output. The near-blue color signal has a 180° phase difference from the color burst signal, as shown in FIG. 3, when the level of $\phi_2$ (fs) is HIGH the LEVEL-3 of the near-blue color signal is output, and when the level of $\phi_1$ (fs) is HIGH the LEVEL-4 of the near-blue color signal is output, and thus the near-blue color signal having a phase angle of 0° is obtained, which is near the blue color signal having the phase angle of 347.6° and the relative amplitude of 0.44.

It is possible to obtain a near-yellow color signal which is near the yellow color signal having the phase angle of 167.6° and the relative amplitude of 0.44, by replacing the LEVEL-3 and LEVEL-4 in the composite video signal shown in FIG. 4.

Also, it is possible to obtain a near-red color signal having a phase angle of 90° which is near the red signal having the phase angle of 103.5° and the relative amplitude of 0.63, and a near-cyan color signal having a phase angle of 270° which is near the cyan signal having the phase angle of 283.5° and the relative amplitude of 0.63. In this case, the duty cycle of the basic clock signal of the frequency 2fs is 50%.

Figure 5B:
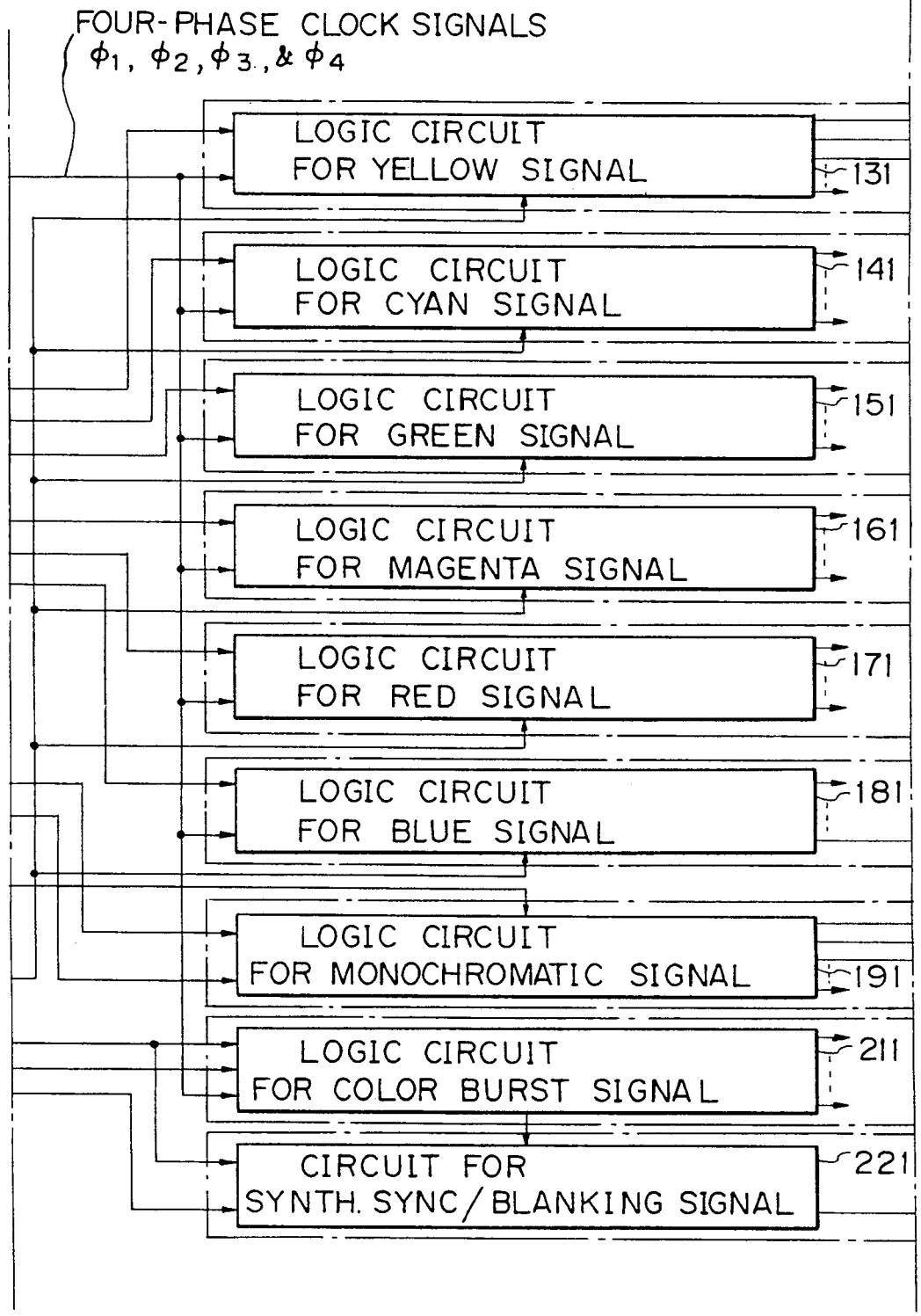
FIG. 5 is a diagram of the arrangement showing FIGS. 5A, B and C.
FIGS. 5A, B and C are schematic diagrams of the device according to an embodiment of the present invention.
Figure 5C:
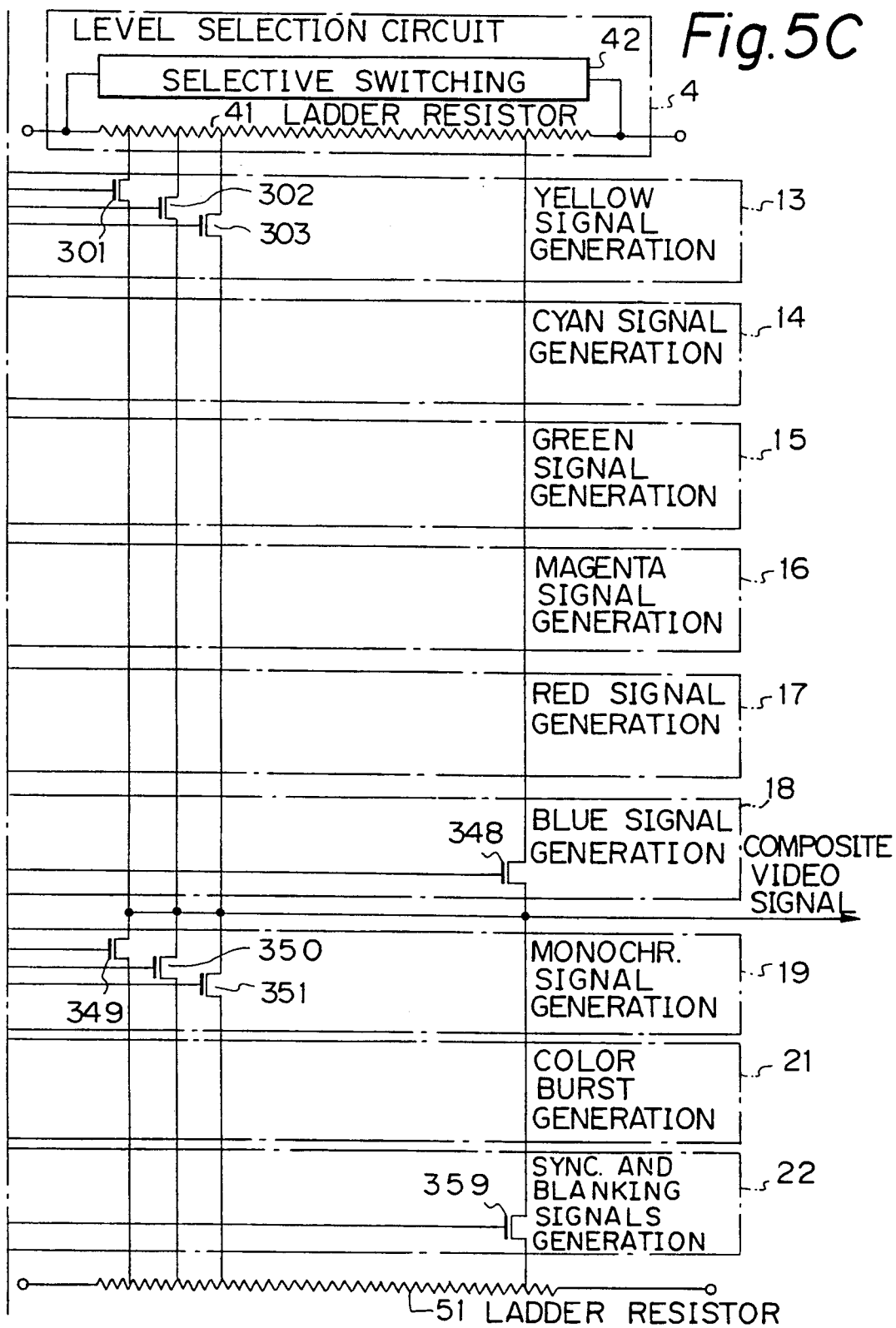
Figures 6, 6A:
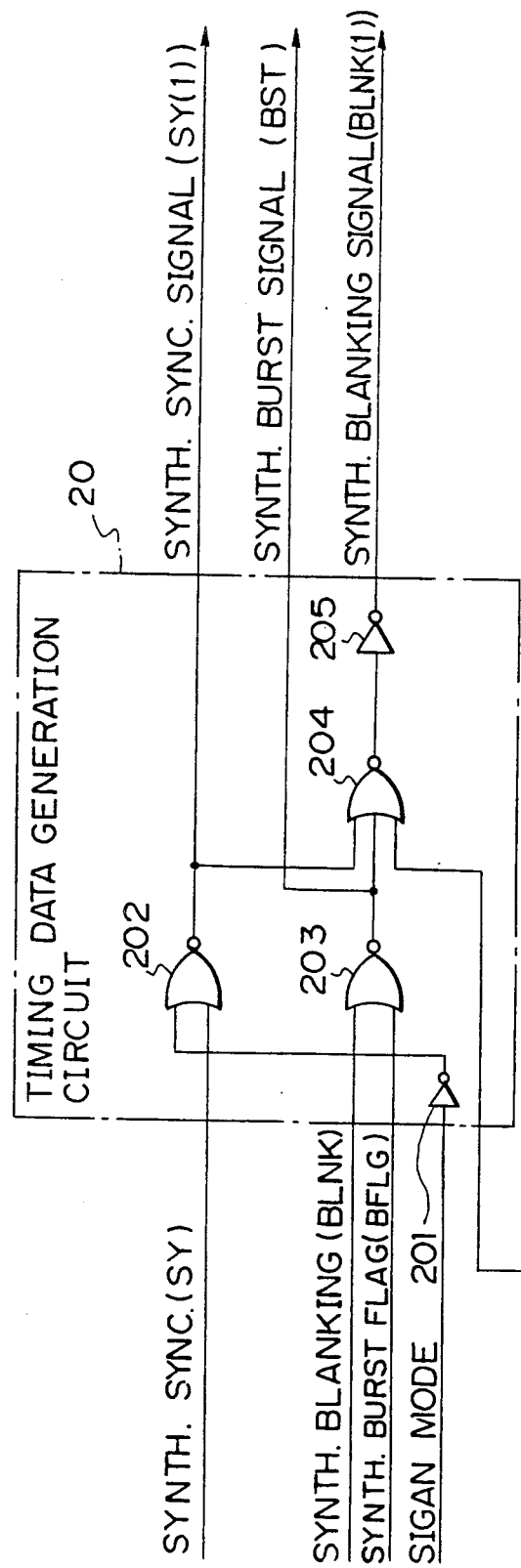
FIG. 6 is a diagram of the arrangement showing FIGS. 6A and B.
FIGS. 6A and B show the structures of the color data generation circuit and the timing data generation circuit in the device of FIGS. 5A, B and C.
Figure 7B:
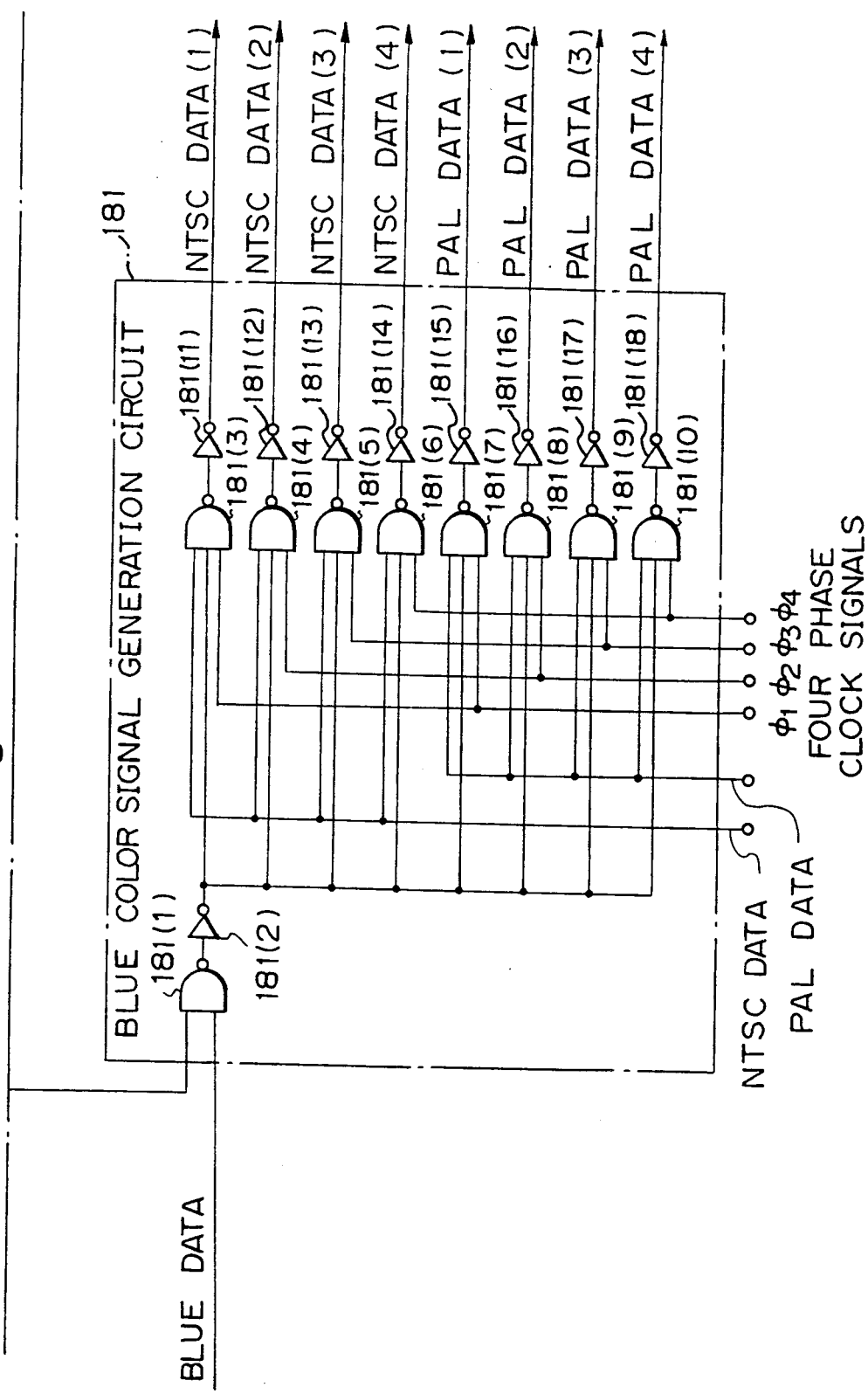
FIG. 7 is a diagram of the arrangement showing FIGS. 7A and B.
FIGS. 7A and B show the structure of the blue color signal generation circuit in the device of FIGS. 5A, B and C.
Figure 8A:
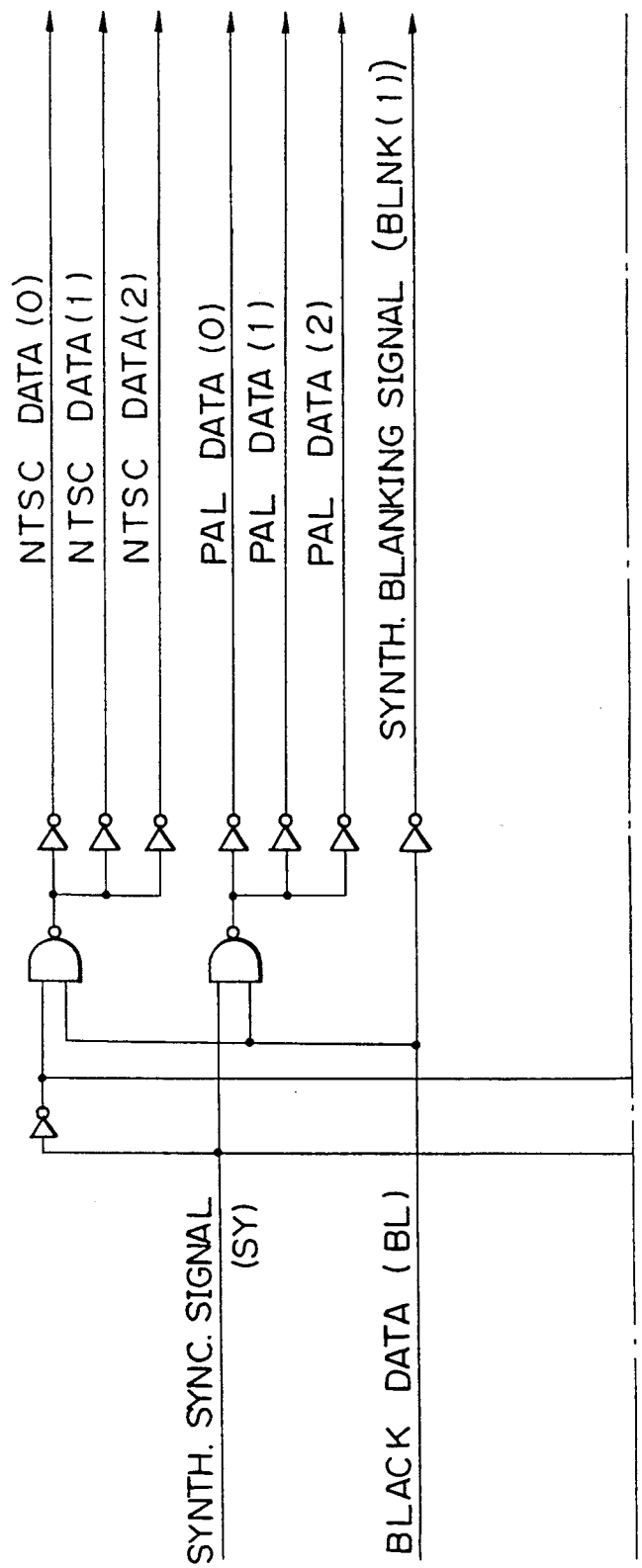
FIGS. 8A and B show the structure of the circuits for generating some of the control signals in the device of FIGS. 5A, B and C.
Figure 8B:
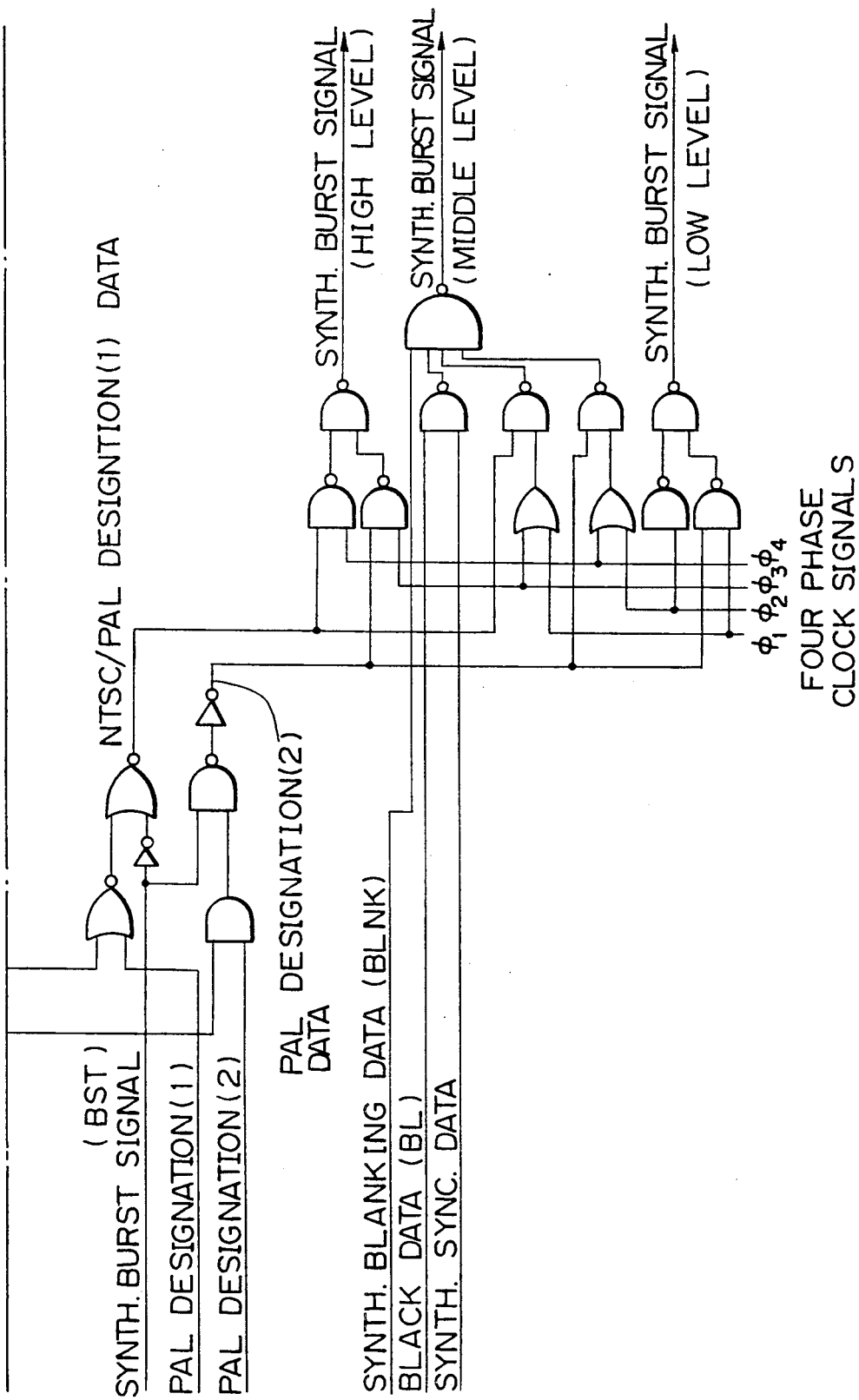
FIG. 8 is a diagram of the arrangement showing FIGS. 8A and B.

A device for controlling a color video display according to an embodiment of the present invention is shown in FIG. 5. The structure of the timing data generation circuit and the color data generation circuit in the device of FIG. 5 is shown in FIG. 6; the structure of the blue color signal generation circuit in the device of FIG. 5 is shown in FIG. 7; and the structure of the circuits for generating some of the control signals in the device of FIG. 5 is shown in FIG. 8.

The device of FIG. 5 includes a clock signal generation circuit 11 having a counter 111, a demultiplexing circuit 112, and a latch circuit 113, a color data generation circuit 12, a yellow signal generation circuit 13, a cyan signal generation circuit 14, a green signal generation circuit 15, a magenta signal generation circuit 16, a red signal generation circuit 17, a blue signal generation circuit 18, a monochromatic signal generation circuit 19, a timing data generation circuit 20, a color burst signal generation circuit 21, and a synchronization and blanking signals generation circuit 22. The device of FIG. 5 also includes a level selection circuit 4 having a ladder resistor 41 and a selective switching circuit 42, and a ladder resistor 51.

The clock signal generation circuit 11 produces four-phase clock signals $\phi_1$, $\phi_2$, $\phi_3$, and $\phi_4$ from the signal having a frequency of 4fs which is equal to 3.58 MHz where fs is the frequency of the subcarrier.

It is possible to produce four-phase clock signals $\phi_1$, $\phi_2$, $\phi_3$, and $\phi_4$ by frequency-dividing the signal having the frequency 4fs, further frequency-dividing the signal having the frequency 2fs, and processing the signal through a latch circuit such as a dynamic flip-flop.

The color data generation circuit 12 constituted by a demultiplexing circuit produces yellow, cyan, green, magenta, red, and blue color data, white data, and black data from attribute bits for characters, green data G, red data R, and blue data B.

The yellow signal generation circuit 13 is constituted by a logic circuit for yellow signal generation 131 and switching transistors 301, 302, 303, and so on.

The yellow signal generation circuit 13 receives four-phase clock signals, $\phi_1$, $\phi_2$, $\phi_3$, and $\phi_4$, the yellow data, the NTSC/PAL mode selection data, carries out a yellow signal generation logic operation, selects the voltages divided along the ladder resistor 41 through the transistors 301, 302, 303, and so on, and outputs a yellow signal.

Each of the cyan, the green, the magenta, the red, and the blue signal generation circuits 14, 15, 16, 17, and 18 has the same constitution as the yellow signal generation circuit 13.

The monochromatic signal generation circuit 19 is constituted by a logic circuit for monochromatic signal generation 191 and switching transistors 349, 350, 351, and so on.

The monochromatic signal generation circuit 19 receives white color data and black color data, carries out a monochromatic signal generation operation, selects the voltages divided along the ladder resistor 51 through the transistors 349, 350, 351, and so on, and outputs a monochromatic signal.

The timing data generation circuit 20 receives the signal having the frequency 4fs and outputs a synthetic blanking data, a synthetic burst flag data, and a synthetic synchronization signal including vertical and horizontal synchronization data. The timing data generation circuit 20 also outputs NTSC/PAL mode selection data needed when switching to the PAL system, in which the color signals are reversed per each horizontal synchronization data.

The color burst signal generation circuit 21 is constituted by a logic circuit for a color burst signal 211 and switching transistors (not shown). The color burst signal generation circuit 21 receives the four-phase clock signals $\phi_1$, $\phi_2$, $\phi_3$, and $\phi_4$, the synthetic blanking data, the synthetic burst flag data, and the NTSC/PAL mode selection data, carries out a color burst signal generation logic operation, selects the voltages divided along the ladder resistor 51 through the transistors (not shown), and outputs a color burst signal.

The synchronization and blanking signal generation circuit 22 is constituted by a circuit for synthetic synchronization/synthetic blanking signal generation and a switching transistor 359. The synchronization and blanking signal generation circuit 22 receives the synthetic synchronization data and the synthetic blanking data, selects the voltages divided along the ladder resistor 51 through the switching transistor 359, and outputs a synthetic synchronization signal and a synthetic blanking signal.

The logic circuit for carrying out the blue color signal generation operation will be explained with reference to FIG. 7. The NAND operation between the BLACK DATA and the BLUE DATA is carried out in the NAND gate 181 (1), and the produced output is supplied to the inverter 181 (2). Each of three-input NAND gates 181 (3) to 181 (10) receives NTSC data or PAL data as the first input, the output signal of the inverter 181 (2) as the second input, and one of the four-phase clock signals $\phi_1$, $\phi_2$, $\phi_3$, and $\phi_4$ as the third input. The obtained signals are supplied to the inverters 181 (11) to 181 (18) and NTSC DATA (1) to (4) and PAL DA.TA (1) to (4) are produced. By synthesizing the divided voltages along the ladder resistor 41 based on the NTSC DATA (1) to (4) and PAL DATA (1) to (4) through the switching transistors 341 to 348, the blue color signal is produced.

The yellow color signal, the cyan color signal, the green color signal, the magenta color signal, the red color signal, the monochromatic color signal are produced in the same way in the yellow signal generation circuit 13, the cyan signal generation circuit 14, the green signal generation circuit 15, the magenta signal generation circuit 16, the red signal generation circuit 17, and the monochromatic color generation circuit 19.

The color burst signal, the NTSC DATA (0), (1), and (2), the PAL DATA (0), (1), and (2), and the synthetic burst signal having a high, middle, and low level are produced in the circuit of FIG. 8, which is a portion of the circuit of FIG. 5. The NTSC DATA (0), (1), and (2), and the PAL DATA (0), (1), and (2) are produced by a logic calculation based on the synthetic synchronization signal (SY), the black color data (BL), and PAL designation (1) data. The PAL DATA (0), (1), and (2) are produced by a logic calculation of the synthetic synchronization signal (SY) and the black color data (BL). PAL designation (1) data or PAL designation (2) data is designated from outside.

The synthetic burst signal (high level), the synthetic burst signal (middle level), and the synthetic burst signal (low level) are produced by a logic calculation of the four-phase clock signals $\phi_1$, $\phi_2$, $\phi_3$, and $\phi_4$, the synthetic blanking data (BLNK), the black color data (BL), the synthetic synchronization data (SY), the NTSC/PAL DESIGNATION (1) data, and the PAL DESIGNATION (2) data.

The waveform synthesis by the selection of a voltage amplitude using a ladder resistor in the device of FIG. 5 will be explained with reference to FIGS. 9 and 10.

Figure 9:
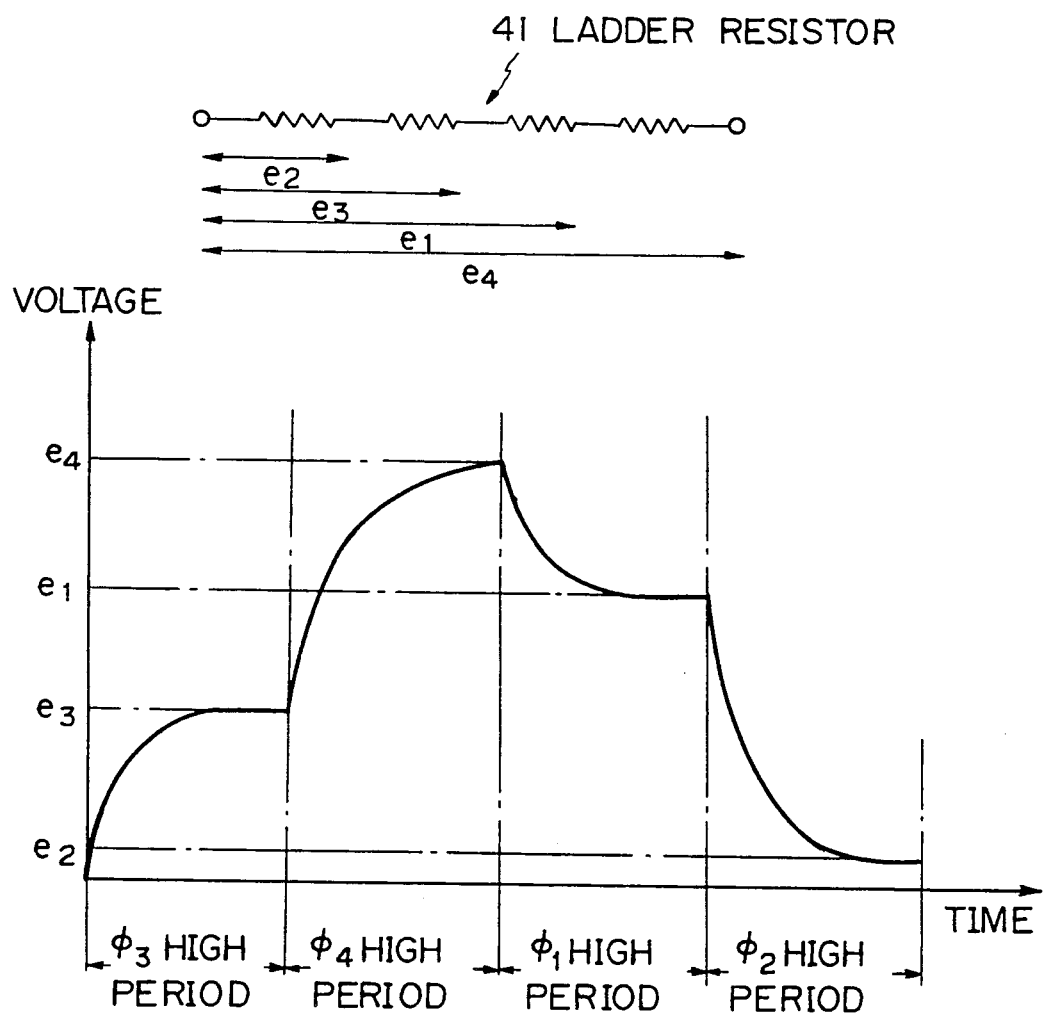
FIG. 9 shows the waveform synthesis for the blue color signal.

The waveform synthesis for the blue color signal is shown in FIG. 9. In the ladder resistor 41, one resistance element generates a voltage $e_2$, two resistance elements a voltage $e_3$, three resistance elements a voltage $e_1$, and four resistance elements a voltage $e_4$. During $\phi_1$ a HIGH period voltage $e_1$ is generated during $\phi_2$ a HIGH period voltage $e_2$ is generated, during $\phi_3$ a HIGH period voltage $e_3$ is generated, and during $\phi_4$ a HIGH period voltage $e_4$ is generated. Accordingly, the blue color signal is synthesized by arranging the four phase clock signals in the sequence $\phi_3$, $\phi_4$, $\phi_1$, and $\phi_2$.

Figure 10:
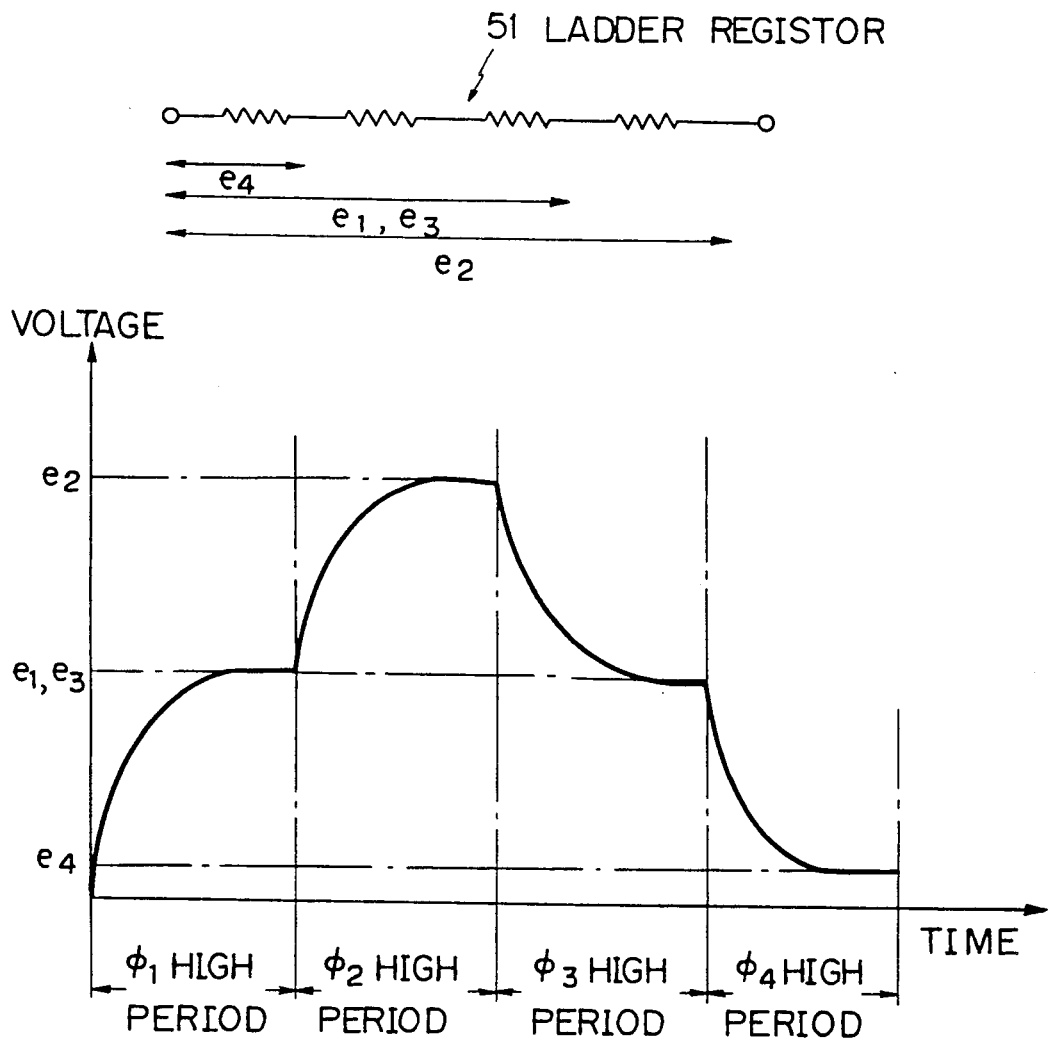
FIG. 10 shows the waveform synthesis for the color burst signal.

The waveform synthesis for the color burst signal is shown in FIG. 10. In the ladder resistor 51, one resistance element generates a voltage $e_4$, three resistance elements a voltage $e_1$ ($e_3$), and four resistance elements a voltage $e_2$. During $\phi_1$ a HIGH period voltage $e_1$ ($e_3$) is generated, during $\phi_2$ a HIGH period voltage $e_2$ is generated, during $\phi_3$ a HIGH period voltage $e_1$ ($e_3$) is generated, and during $\phi_4$ a HIGH period voltage $e_4$ is generated. Accordingly, the color burst signal is synthesized by arranging the four phase clock signal in the sequence $\phi_1$, $\phi_2$, $\phi_3$, and $\phi_4$.

Figure 11:
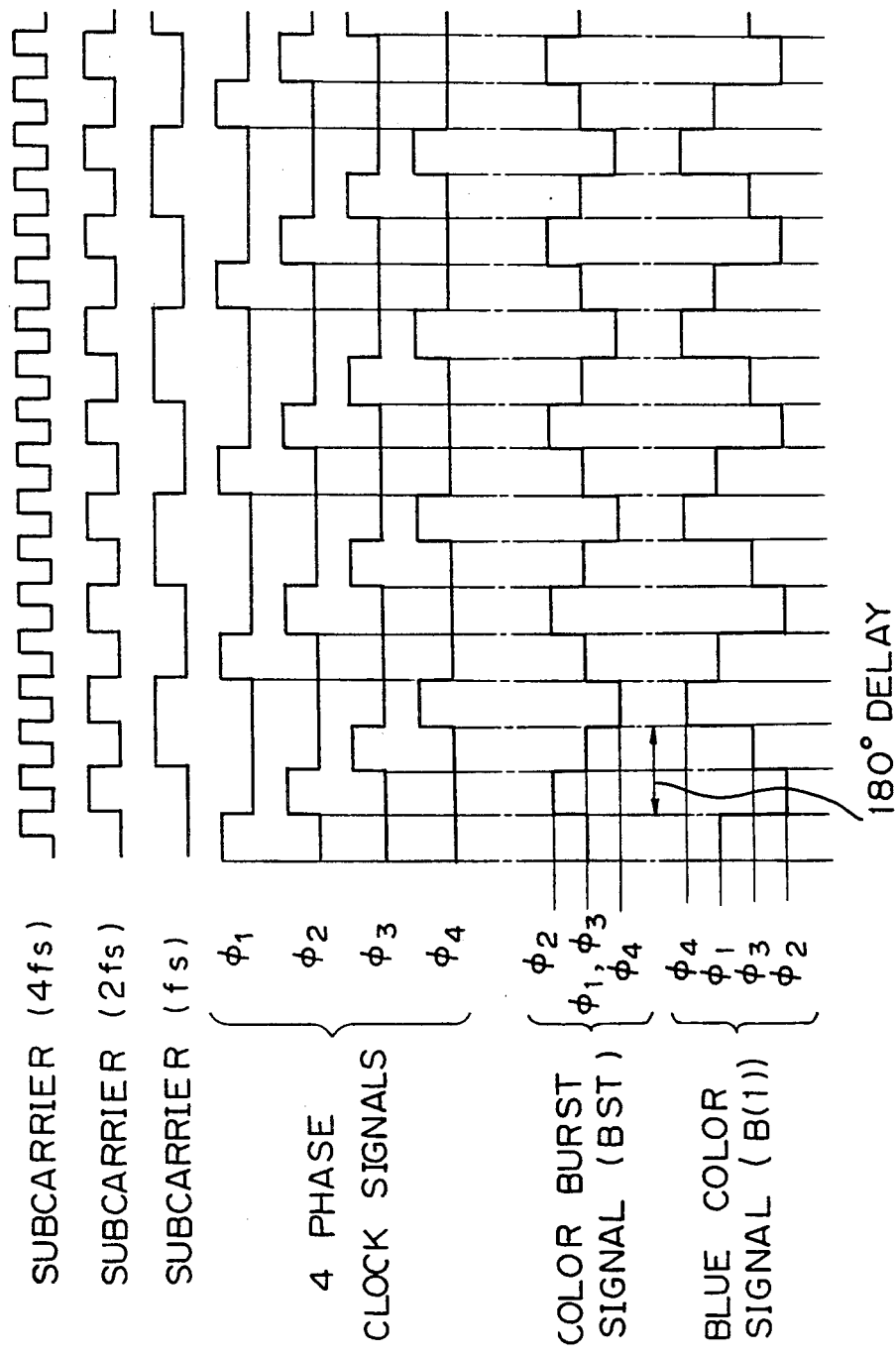
FIG. 11 illustrates the formation of the blue color signal and the color burst.

The generation of the color burst signal (BST) and the blue color signal (B(1)) in the device of FIG. 5 is illustrated in FIG. 11. FIG. 11 shows the waveforms of a subcarrier having a frequency 4fs, a subcarrier having a frequency 2fs, a subcarrier having a frequency fs, which is equal to 3.58 MHz, four-phase clock signals $\phi_1$, $\phi_2$, $\phi_3$, and $\phi_4$, a color burst signal (BST), and a blue color signal (B(1)).

Figure 12:
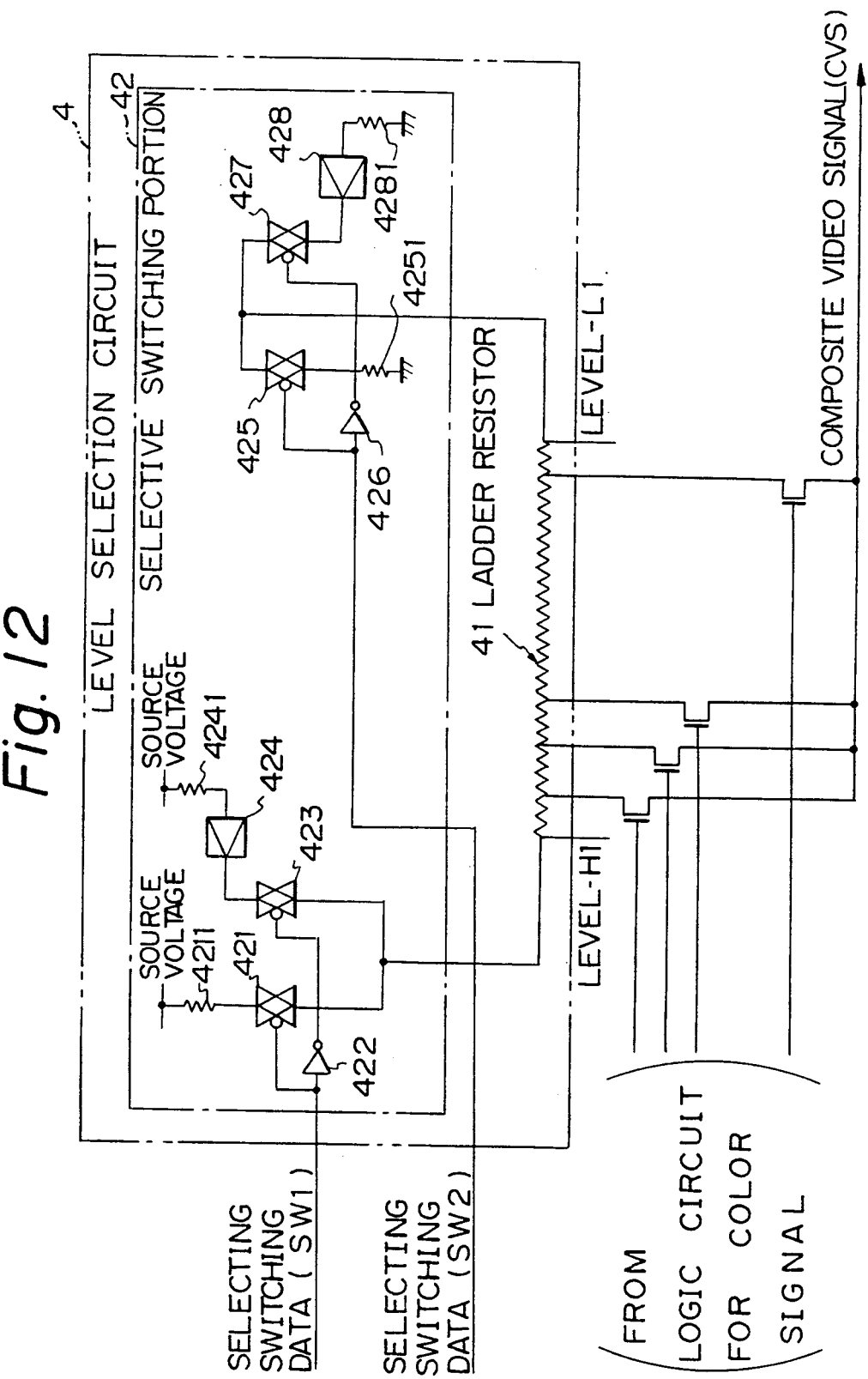
FIG. 12 shows the structures of the level selection circuit and a ladder resistor.

The structure of the level selection circuit 4 in connection with switching transistors is shown in FIG. 12.

The selective switching portion 42 in the level selection circuit 4 is constituted by switching transistors 421, 423, 425, and 427, inverters 422 and 426, and level fixing resistors 4211, 4241, 4251, and 4281. A voltage amplitude level LEVEL-Hl or voltage amplitude level LEVEL-Ll is selected by the switching transistors 421, 423, 425, and 427 based on selecting switching data SW1 and selecting switching data SW2. By turning ON the switching transistors 421 and 425, it is possible to divide the source voltage of, for example, 5V, by the resistors 4211 and 4251, and apply a voltage of 2V across the ladder resistor 41. By further turning ON the switching transistors 423 and 427, it is possible to divide the source voltage of, for example 5V, by the resistors 4241 and resistor 4281, and apply a voltage of 1V across the ladder resistor 41.

By selecting the divided voltages along the ladder resistor 41 to be between LEVEL-Hl and LEVEL-Ll through the transistors 301 to 348, and synthesizing the selected voltages, a composite video signal is obtained.

Figure 13:
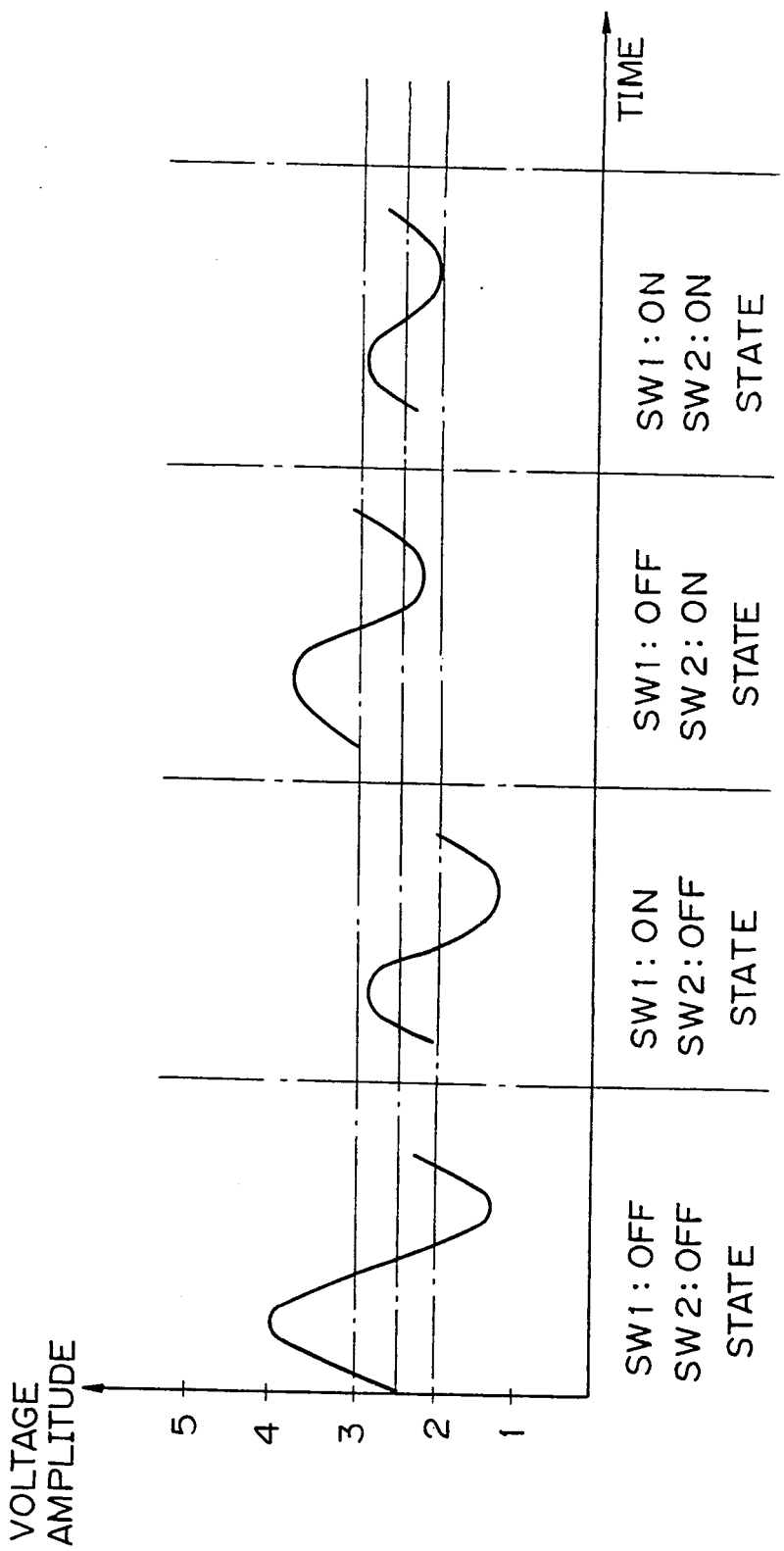
FIG. 13 shows the waveform of the composite video signal.

The waveforms of the composite video signal (CVS) in correspondence with the state of the switching data SW1 and SW2 are shown in FIG. 13. Where both SW1 and SW2 are OFF, the voltage amplitude applied to the ladder resistor 41 is at a maximum, and thus the depth of the color is at a maximum and the brightness at the central level is 2.5.

Where SW1 is in ON and SW2 is OFF, an intermediate voltage amplitude is applied to the ladder resistor 41, and thus an intermediate depth of color is obtained and the brightness of the central level is 2. Where SW1 is OFF and SW2 is ON an intermediate depth of the color is obtained and the brightness of the central level is 3.0, and where both SW1 and SW2 are ON a minimum depth of color is obtained and the brightness of the central level is 2.5.

The above description is of the operation of the device of FIG. 5 with the NTSC system, and therefore the operation of the PAL system will be described below with reference to FIG. 14 to 21.

Figure 14:
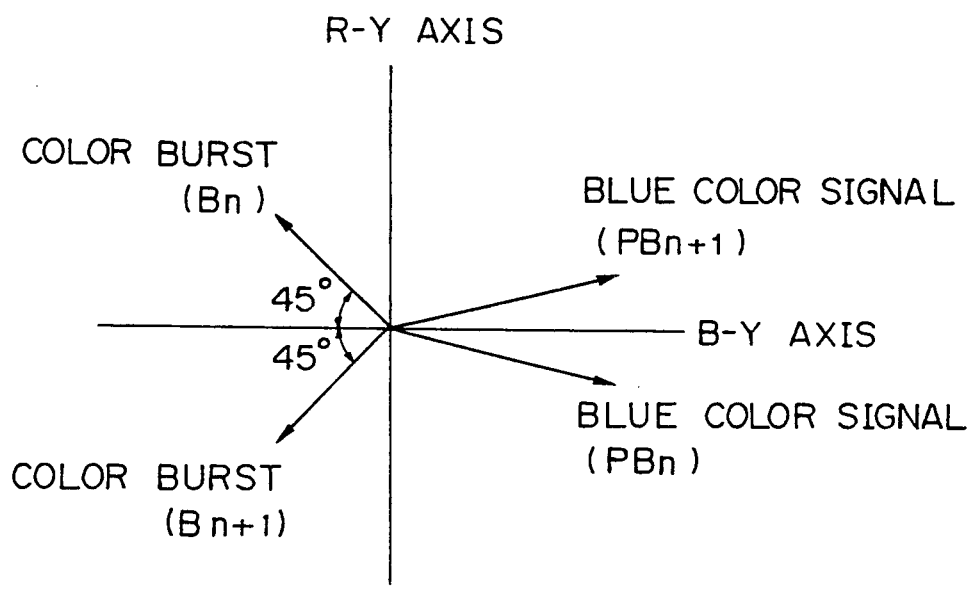
FIG. 14 is a vector diagram according to the PAL system of the prior art.

The vector diagram according to the PAL system of the prior art is illustrated in FIG. 14. In FIG. 14, the R-Y axis is the color difference signal axis for the red color signal and the luminance signal, and the B-Y axis is the color difference signal axis for the blue color signal and the luminance signal. The vector of the color burst signal ($B_n$) is shown in which the color burst signal at the horizontal scanning timing "n" has a 45° phase difference from the B-Y axis. The vector of the blue color signal ($PB_n$) is shown in which the color burst signal is at this horizontal scanning timing. The color burst signal ($B_{n+1}$) and the blue color signal ($PB_{n+1}$) are at the horizontal scanning timing "n+1".

Figure 15:
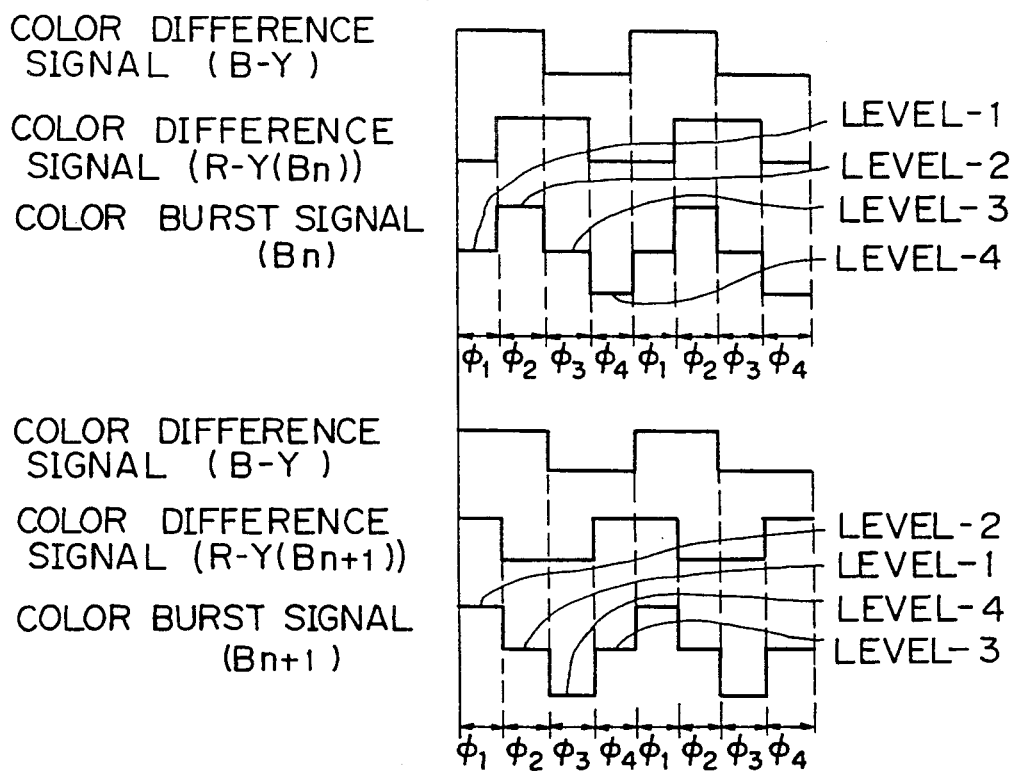
FIG. 15 illustrates the color burst signals at horizontal scanning n and n+1 in the PAL system.

The waveforms of the color burst signals at the horizontal scanning timing "n" and "n+1" are shown in FIG. 15. In FIG. 15, the upper three waveforms are the color difference signal (B-Y), the color difference signal (R-Y($B_n$)), and the color burst signal ($B_n$) at the horizontal scanning timing "n", and the lower three waveforms are the color difference signal (B-Y), the color difference signal (R-Y($B_{n+1}$)), and the color burst signal $B_{n+1}$ at the horizontal scanning timing "n+1". In the timing "n", the phase difference between the color difference signals B-Y and R-Y is 90°, and level-1 is selected during the $\phi_1$ HIGH level, level-2 during the $\phi_2$ HIGH level, level-3 during the $\phi_3$ HIGH level, and level-4 during the $\phi_4$ HIGH level.

At the timing "n+1", the color signal (R-Y($B_{n+1}$)) is an inversion of the color signal (R-Y($B_n$)), and level-2 is selected during the $\phi_1$ HIGH level, level-1 during the $\phi_2$ HIGH level, level-4 during the $\phi_3$ HIGH level, and level-3 during the $\phi_4$ HIGH level.

The selection of the NTSC system and the PAL system is carried out by calculating PAL DESIGNATION (1) data and PAL DESIGNATION (2) data shown in FIG. 8, and using NTSC data, PAL DESIGNATION (1) data, and PAL DESIGNATION (2) data, by switching a line switch (not shown).

The waveforms of the color signals for six colors according to the PAL system in the device of FIG. 5 are shown in FIGS. 16 to 21.

Figure 16:
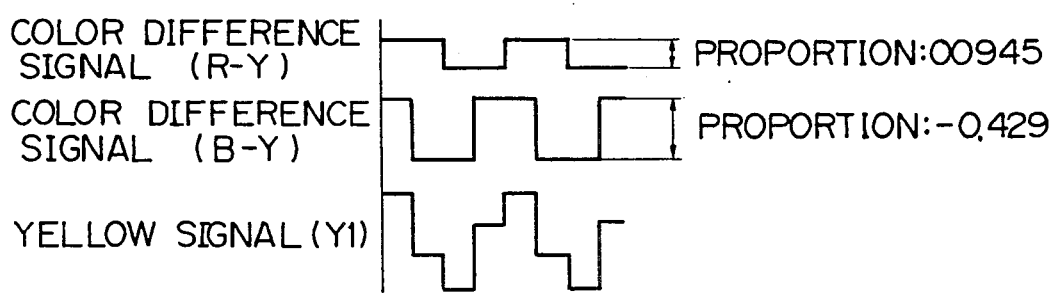
FIGS. 16 to 21 illustrate the waveforms of the signals in the PAL system.
Figure 17:
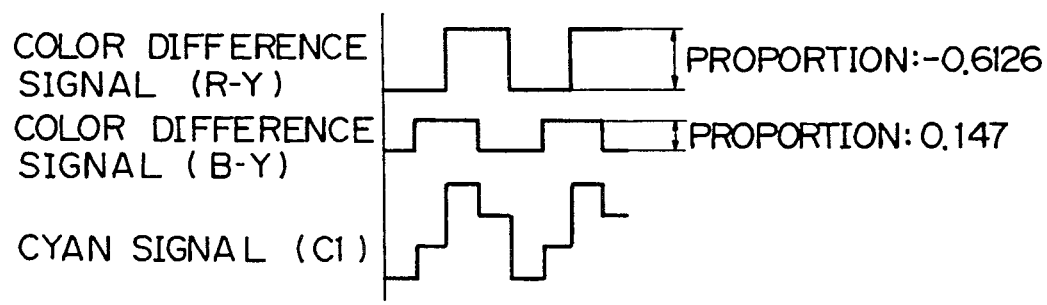
Figure 18:
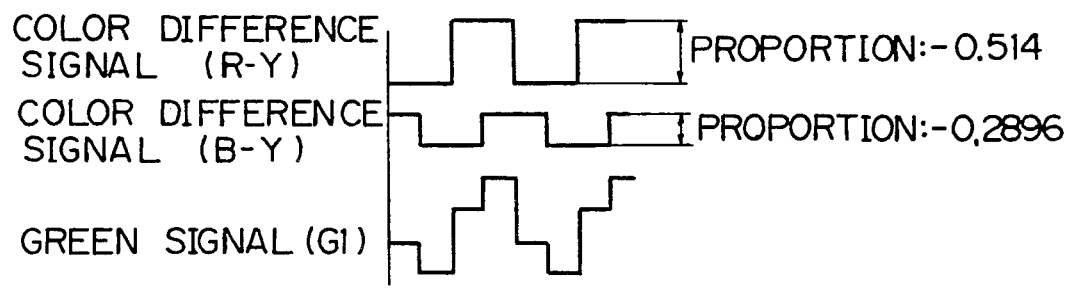
Figure 19:
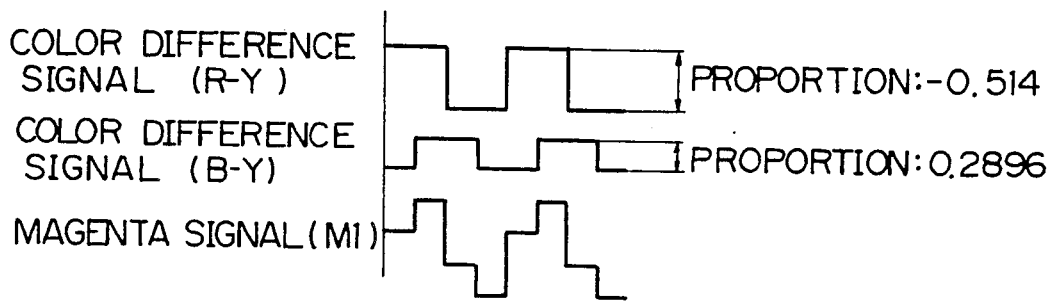
Figure 20:
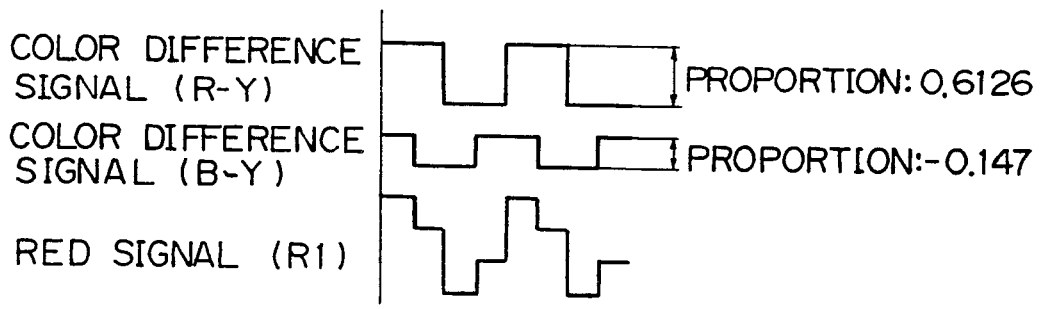
Figure 21:
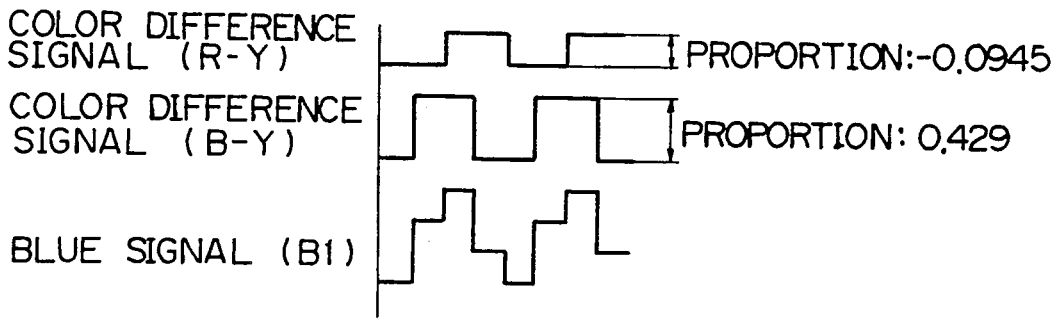

The waveforms for the yellow signal (Y1) are shown in FIG. 16. The proportion of the color difference signal (R-Y) is the product of the yellow signal amplitude and sine of the reference phase angle 167.6°; the proportion of the color difference signal (B-Y) is the product of the yellow signal amplitude and cosine of the reference phase angle 167.6°; the proportion of the color difference signal R-Y for the yellow signal (Y1) is 0.0945; and the proportion of the color difference signal B-Y is −0.429.

The waveforms for the cyan, green, magenta, red, and blue signals are shown in the same way in FIGS. 17 to 21, respectively.

The formation of the composite video signal in the device of FIG. 5 is illustrated in FIG. 22. In one horizontal scanning period for the composite video signal between the adjacent synthetic synchronization signals (SY(1)), the color burst signal (BST) and the synthetic color signal are present, and between the adjacent synthetic blanking signals (BLNK(1)), the synthetic synchronization signal (SY(1)) consisting of a horizontal synchronization signal and a vertical synchronization signal, the synthetic burst flag signal (BFLG), and the color burst signal (BST(1)), for 8 to 12 cycles, are present.

We claim:

1. A device for controlling a color video display comprising:
    ladder resistor means having a plurality of taps;
    clock signal generating means for generating four-phase clock signals having the same frequency as a frequency of a subcarrier from a clock signal having a frequency which is four times the frequency of the sub-carrier; and
    color signal generating means for receiving data, corresponding to colors to be displayed, and for successively selecting different sequences of said taps of said ladder resistor means based on said four-phase clock signals generated by said clock signal generating means wherein color signals having a predetermined phase relationship therebetween are generated.

2. A device according to claim 1, wherein a voltage across said ladder resistor means is changed based on a control signal from said color signal generating means.

3. A device according to claim 1, wherein said color signal generating means comprises:
    a first color signal generating portion for receiving said four-phase clock signals and yellow color data and generating a yellow color signal having a predetermined amplitude;
    a second clock signal generating portion for receiving said four-phase clock signals and cyan color data and generating a yellow color signal having a predetermined amplitude;
    a third color signal generating portion for receiving said four-phase clock signals and green color data and generating a green color signal having a predetermined amplitude;
    a fourth color signal generating portion for receiving said four-phase clock signals and magenta color data and generating a magenta color signal having a predetermined amplitude;
    a fifth color signal generating portion for receiving said four-phase clock signals and red color data and generating a red color signal having a predetermined amplitude;
    a sixth color signal generating portion for receiving said four-phase clock signals and blue color data and generating a blue color signal having a predetermined amplitude;
    a seventh color signal generating portion for receiving white color data and black color data and generating a monochromatic color signal;
    a synthetic signal outputting portion for receiving a clock signal having a frequency which is four times the frequency of the sub-carrier and outputting synthetic synchronization data, burst flag data, and synthetic blanking data;
    a burst signal generating portion for receiving said four-phase clock signals, said burst flag data, and said synthetic synchronization data and generating a burst signal; and
    a synthetic synchronization signal and synthetic blanking signal generating portion for receiving said synthetic blanking data, said burst flag data, and said synthetic synchronization data and generating a synthetic synchronization signal and a synthetic blanking signal having a predetermined amplitude.

4. A device for controlling a color video display comprising:

ladder resistor means having a plurality of taps;

clock signal generating means for generating four-phase clock signals having the same frequency as a frequency of a subcarrier from a clock signal having a frequency which is four times the frequency of the sub-carrier; and color signal generating means for receiving data, corresponding to colors to be displayed, and for successively selecting different sequences of said taps of said ladder resistor means based on said four-phase clock signals, wherein color signals are generated, said color signals generating means includes a first color signal generating portion for receiving said four-phase clock signals and yellow clock data and generating a yellow color signal having a predetermined amplitude, a second color signal generating portion for receiving said four-phase clock signals and cyan color data and generating a cyan color signal having a predetermined amplitude, a third color signal generating portion for receiving said four-phase clock signals and green color data and generating a green color signal having a predetermined amplitude, a fourth color signal generating portion for receiving four-phase clock signals and magenta color data and generating a magenta color signal having a predetermined amplitude, a fifth color signal generating portion for receiving said four-phase clock signals and red color data and generating a red color signal having a predetermined amplitude, a sixth color signal generating portion for receiving said four-phase color signals and blue color data and generating a blue color signal having a predetermined amplitude, a seventh color signal generating portion for receiving white color data and black color data and generating a monochromatic color signal, a synthetic signal output portion for receiving a clock signal having a frequency which is four times the frequency of the sub-carrier and outputting synthetic synchronization data, burst flag data, and synthetic blanking data, a burst signal generating portion for receiving said four-phase clock signals, said burst flag data, and said synthetic blanking data, and generating a burst signal, and a synthetic synchronization signal and synthetic blanking signal generating portion for receiving said synthetic blanking data, said burst flag data, and said synthetic synchronization data and generating a synthetic synchronization signal and a synthetic blanking signal having a predetermined amplitude.

* * * * *